Patented July 7, 1936

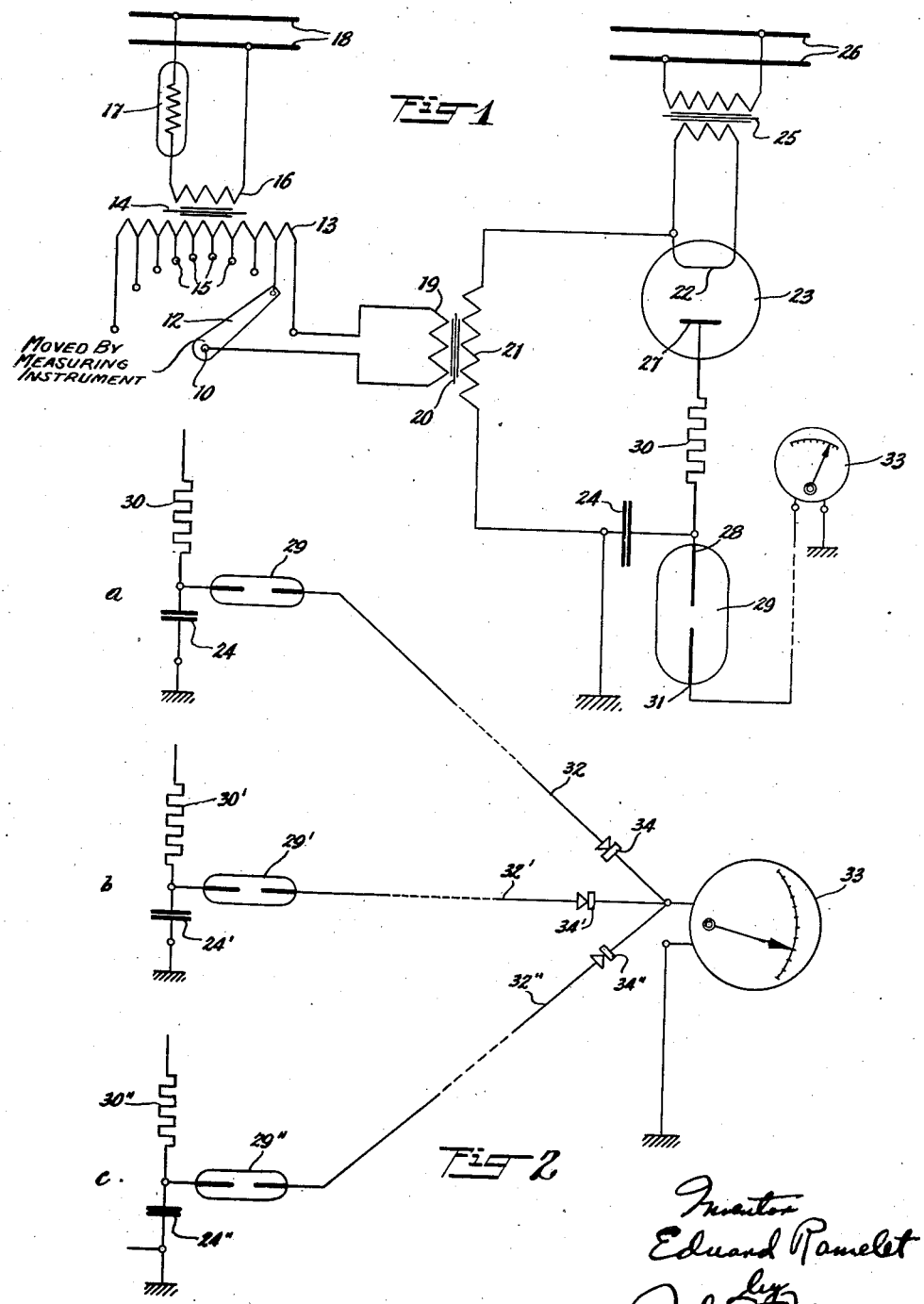

2,046,846

UNITED STATES PATENT OFFICE 2,046,846

TELEMETRIC APPARATUS

Eduard Ramelet, Zug, Switzerland, assignor to Landis & Gyr, A.-G., Zug, Switzerland, a corporation of Switzerland Application July 9, 1932, Serial No. 621,630
In Switzerland July 14, 1931

3 Claims. (Cl. 177—351)

The present invention relates to an apparatus for the telemetric indication of various physical quantities and more particularly to a novel and improved apparatus for the remote measurement of various electrical units.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrate one embodiment of the invention, and together with the description, serve to explain the principles of the invention.

Of the drawing:—

Figure 1 is a diagrammatic illustration showing one embodiment in accordance with the present invention; and Figure 2 is a similar diagram showing a modified embodiment of the present invention.

The present invention has for its object the provision of a simple, reliable, and relatively inexpensive apparatus for the remote measurement of various physical work units such as units of electrical energy. A further object of the invention is the provision of an apparatus in which electrical discharges are transmitted to a galvanometer at a distance, and the frequency of the discharges is determined by the magnitude of the quantity being measured. Still another object is the provision of a novel telemetric device in which the registration is determined by the frequency of a discharge through a gaseous discharge tube, and this frequency is varied by a change in potential.

In accordance with the present invention, a gaseous discharge tube is supplied with energy from a transformer through a rectifier tube and a high resistance, the transformer being supplied with current under control of a primary measuring instrument. The primary measuring instrument may produce a variation in voltage of the current supplied to the transformer, but, preferably and as embodied, the voltage is varied proportionately to the magnitude of the quantity being measured. A condenser is also connected in series with the transformer and high resistance and has one plate connected to ground while the other plate is connected to an electrode of the gaseous discharge tube. These parts constitute a transmitting station and the frequency of discharge through the gaseous discharge tube is determined by the voltage, resistance and capacitance in the discharge circuit, and these are preferably so interrelated as to produce a discharge frequency of several discharges per second.

The receiving station comprises a ballistic measuring instrument, such as a galvanometer, one terminal of which is grounded, while the other is connected to an electrode of the gaseous discharge tube, by a conductor of a length determined by the distance separating the stations.

In the transmitting station, the voltage is preferably varied by means of a variable tapped transformer under control of the primary measuring instrument, and in case electrical quantities are being measured, this instrument may be a wattmeter, or the like.

The invention is also applicable to summation meters and in this case the ballistic galvanometer is connected with a plurality of transmitting stations, and a rectifier is placed in circuit with each of the connecting lines to prevent impulses from one transmitting station influencing the operation of the other stations.

It will be understood that the foregoing general description and the following detailed description as well are exemplary and explanatory of the invention but are not restricted thereon.

Referring now in detail to the illustrative embodiment of the invention shown in Figure 1 of the drawing, the primary measuring instrument is provided with a shaft 10 adapted to be moved by changes in the quantity being measured and positioned in accordance with the magnitude of this quantity. Shaft 10 is provided with an arm 12 adapted to be moved over a series of contacts 15, connected with taps on the secondary winding 13 of a transformer 14, which is energized by a primary winding 16 supplied with energy from mains 18 through a ballast resistance 17. Mains 18 are supplied with alternating current of relatively constant voltage.

One terminal of secondary winding 13 is connected to the primary winding 19 of transformer 20, and this primary is also connected to the contact arm 12 to supply transformer 20 with electrical energy at a voltage determined by the position of contact arm 12. The secondary winding 21 of transformer 20 supplies current to the gaseous discharge tube 29.

The indicating instrument, which is located at a distance from the primary measuring instrument and is controlled thereby, may comprise a ballistic galvanometer 33, one side of which is grounded and the other terminal of which is connected with an electrode 31 of the gaseous discharge tube 29. The other electrode 28 of tube 29 is connected to plate 27 of rectifying tube 23 by means of a relatively high ohmage resistor 30. A condenser 24 is connected between electrode 28 and the ground, the grounded side being also connected to one terminal of secondary winding 21.

Rectifying tube 23 is provided with a filament 22 which is heated to the proper temperature by power supplied from transformer 25 which is connected to mains 26, and this filament is connected to the ungrounded side of secondary winding 21.

Although the values may vary widely dependent upon the condition obtaining in actual practice, the voltage across mains 18 may conveniently be 200 volts, the capacitance of condenser 24 may be 0.001 MF; and the resistance of resistor 30 may be 200 megohms.

With such an apparatus, tube 29 is being constantly charged, and each time that it becomes charged to predetermined value, a discharge through the tube takes place, supplying galvanometer 33 with an actuating impulse. With a constant voltage, resistance and capacitance, the frequency of discharge is constant, but this varies with the variation in the voltage impressed upon the tube, and is proportional to the quantity measured by the primary measuring instrument. Galvanometer 33, which is actuated by the frequency of the impulses, indicates a value proportional to the value measured by the primary measuring instrument.

Figure 2 illustrates a modified embodiment of the invention as arranged for the telemetric summation of the readings of a plurality of primary measuring instruments. In this embodiment, each of the transmitting stations a, b and c comprises an apparatus substantially similar to that shown in Figure 1, but excluding the galvanometer. Each of these stations is provided with its own primary measuring instrument (not shown), its condenser 24, 24', 24'', resistance 30, 30', 30'' and gaseous discharge tube 29, 29', 29''.

The receiving station, for the summation of the readings at each of the several transmitting stations, comprises a single ballistic galvanometer 33 having one of its terminals grounded. The other terminal of the galvanometer is connected to parallel valves 34, 34', 34'', or other rectifying devices having uni-directional conductivity and connected to their respective transmitting stations a, b, and c by means of conductors 32, 32', and 32''. Valves 34, 34', and 34'' prevent impulses from any one of the transmitting stations influencing the impulses transmitted by the other stations, at the same time permitting the impulses to be freely transmitted to the ballistic measuring instrument.

The apparatus according to the present invention is particularly well adapted for telemetry, or the remote indication or summation of primary measurements, inasmuch as the resistance and capacitance of the conductors between the transmitting and receiving stations do not influence the reading of the ballistic instrument.

The invention in its broader aspects is not limited to the specific mechanisms shown and described but departures may be made therefrom within the scope of the accompanying claims without departing from the principles of the invention and without sacrificing its chief advantages.

What I claim is:

1. Telemetric apparatus including in combination a gaseous discharge tube connected in parallel with a condenser and in series with a high resistance and adapted to be charged and discharged periodically at a frequency determined by the resistance, capacitance and voltage of the circuit in which it is used, a primary measuring instrument and means for varying one of the factors in accordance with changes in the quantity measured by the primary instrument, a ballistic measuring instrument at a distance from the discharge tube and a connector for transmitting impulses to said ballistic instrument from said tube.

2. Telemetric apparatus including in combination a gaseous discharge tube connected in parallel with a condenser and in series with a high resistance and adapted to be charged and discharged periodically, a primary measuring instrument, means for varying the voltage applied to said tube by said instrument, a ballistic galvanometer, and means for transmitting impulses from said tube to said galvanometer.

3. Telemetric apparatus as claimed in claim 2, in which the instrument controlled voltage is applied directly to the discharge tube.

EDUARD RAMELET.